United States Patent
Das et al.

(10) Patent No.: US 10,303,646 B2
(45) Date of Patent: May 28, 2019

(54) MEMORY SHARING FOR WORKING DATA USING RDMA

(71) Applicant: Microsoft Technology Licensing, LLC, Redmond, WA (US)

(72) Inventors: Sudipto Das, Redmond, WA (US); Feng Li, Bellevue, WA (US); Manoj A. Syamala, Issaquah, WA (US); Vivek R. Narasayya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 15/081,602

(22) Filed: Mar. 25, 2016

(65) Prior Publication Data
US 2017/0277655 A1 Sep. 28, 2017

(51) Int. Cl.
*G06F 3/06* (2006.01)
*G06F 9/50* (2006.01)
(Continued)

(52) U.S. Cl.
CPC ........ *G06F 15/17331* (2013.01); *G06F 3/061* (2013.01); *G06F 3/067* (2013.01);
(Continued)

(58) Field of Classification Search
CPC .. G06F 15/17331; G06F 12/023; G06F 3/061; G06F 3/0631; G06F 3/0653;
(Continued)

(56) References Cited

U.S. PATENT DOCUMENTS

| 7,418,487 B2 | 8/2008 | Andreas |
| 8,700,724 B2 | 4/2014 | McDaniel et al. |

(Continued)

FOREIGN PATENT DOCUMENTS

EP 2150019 2/2010

OTHER PUBLICATIONS

"International Search Report and Written Opinion Issued in PCT Application No. PCT/US2017/023273", dated May 23, 2017, 11 Pages.
(Continued)

*Primary Examiner* — Brian Whipple
*Assistant Examiner* — James Ross Hollister
(74) *Attorney, Agent, or Firm* — Schwegman Lundberg & Woessner, P.A.

(57) ABSTRACT

A server system may include a cluster of multiple computers that are networked for high-speed data communications. Each of the computers has a remote direct memory access (RDMA) network interface to allow high-speed memory sharing between computers. A relational database engine of each computer is configured to utilize a hierarchy of memory for temporary storage of working data, including in order of decreasing access speed (a) local main memory, (b) remote memory accessed via RDMS, and (c) mass storage. The database engine uses the local main memory for working data, and additionally uses the RDMA accessible memory for working data when the local main memory becomes depleted. The server system may include a memory broker to which individual computers report their available or unused memory, and which leases shared memory to requesting computers.

20 Claims, 5 Drawing Sheets

(51) Int. Cl.
  G06F 9/54      (2006.01)
  G06F 12/02     (2006.01)
  G06F 15/173    (2006.01)
(52) U.S. Cl.
  CPC .......... *G06F 3/0631* (2013.01); *G06F 3/0653* (2013.01); *G06F 9/5016* (2013.01); *G06F 9/54* (2013.01); *G06F 12/023* (2013.01); *G06F 2209/509* (2013.01); *G06F 2212/1016* (2013.01); *G06F 2212/163* (2013.01); *G06F 2212/254* (2013.01); *G06F 2212/263* (2013.01); *G06F 2212/264* (2013.01)
(58) Field of Classification Search
  CPC ............... G06F 3/067; G06F 2212/263; G06F 2212/1016; G06F 2212/163; G06F 2212/254; G06F 2212/264
  See application file for complete search history.

(56) References Cited

U.S. PATENT DOCUMENTS

| | | | |
|---|---|---|---|
| 9,009,116 | B2 | 4/2015 | Cattell et al. |
| 9,176,911 | B2 | 11/2015 | Davis et al. |
| 2003/0200209 | A1* | 10/2003 | Smith ............... G06F 17/30433 |
| 2004/0148360 | A1 | 7/2004 | Mehra et al. |
| 2005/0188055 | A1* | 8/2005 | Saletore ............. H04L 67/1097 709/218 |
| 2006/0190552 | A1 | 8/2006 | Henze et al. |
| 2007/0239661 | A1* | 10/2007 | Cattell ................ G06F 17/3048 |
| 2008/0313364 | A1 | 12/2008 | Flynn et al. |
| 2013/0318277 | A1 | 11/2013 | Dalal et al. |
| 2014/0019708 | A1* | 1/2014 | Erdmann ............ G06F 12/0284 711/172 |
| 2014/0280024 | A1 | 9/2014 | Baskett et al. |
| 2014/0337457 | A1 | 11/2014 | Nowoczynski et al. |
| 2014/0358848 | A1 | 12/2014 | Guarrieri et al. |
| 2015/0006478 | A1 | 1/2015 | Raymond et al. |
| 2015/0039712 | A1 | 2/2015 | Frank et al. |
| 2015/0058384 | A1 | 2/2015 | Karamanolis et al. |
| 2015/0278291 | A1 | 10/2015 | Grosman et al. |
| 2015/0293881 | A1* | 10/2015 | Raikin ................ G06F 12/1072 709/212 |
| 2016/0294983 | A1* | 10/2016 | Kliteynik .......... G06F 15/17331 |
| 2017/0111468 | A1* | 4/2017 | Ash ..................... H04L 67/2852 |

OTHER PUBLICATIONS

Vavilapalli, et al., "Apache Hadoop YARN: Yet Another Resource Negotiator", In Proceedings of the 4th annual Symposium on Cloud Computing, Oct. 1, 2013, 16 pages.
Wu, et al., "PVFS over InfiniBand: Design and Performance Evaluation", In Proceedings of the 32nd International Conference on Parallel Processing, Oct. 6, 2003, 8 pages.
Zikopoulos, et al.,"What is DB2 pureScale?", Published on: Jan. 22, 2010 Available at: http://www.ibm.com/developerworks/data/library/dmmag/DBMag_2010_Issue1/DBMag_Issue109_pureScale/, 5 pages.
"Actian Matrix MPP Analytics Database", Retrieved on: Jan. 11, 2016, Available at: http://www.actian.com/products/analytics-platform/matrix-mpp-analytics-database/, 5 pages.
Amza, et al., "TreadMarks: Shared memory computing on networks of workstations", In Journal of Computer, vol. 29, Issue 2, Feb. 1996, pp. 1-26.
Barthels, et al., "Rack-Scale In-Memory Join Processing using RDMA", In Proceedings of the ACM SIGMOD International Conference on Management of Data, May 27, 2015, pp. 1463-1475.
Canim, et al., "SSD Bufferpool Extensions for Database Systems", In Proceedings of the VLDB Endowment, vol. 3, No. 2, Sep. 13, 2010, pp. 1435-1446.
Carter, et al., "Implementation and Performance of Munin", In Proceedings of the thirteenth ACM symposium on Operating systems principles, Oct. 13, 1991, pp. 152-164.
Chang, et al., "Bigtable: A distributed storage system for structured data", In Proceedings of the 7th symposium on Operating systems design and implementation, Nov. 6, 2006, pp. 1-14.
Chaudhuri, et al., "An overview of business intelligence technology", In Proceedings of Communications of the ACM, vol. 54, Issue 8, Aug. 2011, pp. 88-98.
Chaudhuri, et al., "Optimizing queries with materialized views", In Proceedings of the Eleventh International Conference on Data Engineering, Mar. 6, 1995, 25 pages.
Clark, et al., "Live migration of virtual machines", In Proceedings of 2nd Symposium on Networked Systems Design and Implementation, May 2, 2005, 12 pages.
Dar, et al., "Semantic data caching and replacement", In Proceedings of the 22th International Conference on Very Large Data Bases, Sep. 3, 1996, 12 pages.
Das, et al., "Albatross: Lightweight elasticity in shared storage databases for the cloud using live data migration", In Proceedings of the VLDB Endowment, vol. 4, No. 8, May, 2011, pp. 494-505.
Dragojevic, et al., "FaRM: Fast Remote Memory", In Proceedings of 11th USENIX Symposium on Networked Systems Design and Implementation, Apr. 2, 2014, pp. 401-414.
Feinberg, Donald, "In-Memory DBMS vs In-Memory Marketing", Published on: Sep. 28, 2014 Available at: http://blogs.gartner.com/donald-feinberg/2014/09/28/in-memory-dbms-vs-in-memory-marketing/, 6 pages.
Frey, et al., "Minimizing the Hidden Cost of RDMA", In Proceedings of the 29th IEEE International Conference on Distributed Computing Systems, Jun. 22, 2009, 8 pages.
Goncalves, et al., "The Data Cyclotron Query Processing Scheme", In Journal of ACM Transactions on Database Systems, vol. 36, Issue 4, Dec. 2011, 35 pages.
"TPC-H", Retrieved on: Jan. 11, 2016, Available at: http://www.tpc.org/tpch/, 2 pages.
Huang, et al., "High-Performance Design of HBase with RDMA over InfriBand", In Proceedings of IEEE 26th International Parallel and Distributed Processing Symposium, May 21, 2012, pp. 774-785.
Hunt, et al., "Zookeeper: Wait-free coordination for internet-scale systems", In Proceedings of the USENIX conference on USENIX annual technical conference, Jun. 23, 2010, pp. 1-14.
"Improve Performance of a File Server with SMB Direct", Retrieved on: Jan. 11, 2016 Available at: https://technet.microsoft.com/en-us/library/jj134210.aspx, 3 pages.
"Install SQL Server with SMB Fileshare as a Storage Option", Retrieved on: Jan. 11, 2016 Available at: https://msdn.microsoft.com/en-us/library/hh759341.aspx, 3 pages.
Islam, et al, "High performance RDMA-based design of HDFS over InfiniBand", In Proceedings of the International Conference on High Performance Computing, Networking, Storage and Analysis, Nov. 10, 2012, pp. 1-12.
Jose, et al., "Memcached Design on High Performance RDMA Capable Interconnects", In Proceedings of International Conference on Parallel Processing, Sep. 13, 2011, pp. 743-752.
Kalia, et al., "Using RDMA Efficiently for Key-value Services", In Proceedings of the ACM conference on SIGCOMM, Aug. 17, 2014, pp. 295-306.
Kim, et al., "LW-RDMA: Design and Implementation of a Lightweight RDMA API for InfiniBand-based Clusters", In Proceedings of Conference on Research in Adaptive and Convergent Systems, Oct. 9, 2015, pp. 395-399.
"List of RAM drive software.", Retrieved on: Jan. 11, 2016, Available at: https://en.wikipedia.org/wiki/List_of_RAM_drive_software, 7 pages.
Liu, et al., "High performance RDMA-based MPI implementation over infiniband", In International Journal of Parallel Programming, vol. 32, Issue 3, Jun. 1, 2004, 13 pages.
"Mellanox Technologies", Retrieved on: Jan. 16, 2016 Available at: http://www.mellanox.com/, 1 page.
"Microsoft Analytics Platform System", Retrieved on: Jan. 11, 2016 Available at: https://www.microsoft.com/en-us/server-cloud/products/analytics-platform-system/, 6 pages.

(56) References Cited

OTHER PUBLICATIONS

"Microsoft SQL Server: Buffer Pool Extension", Retrieved on: Jan. 11, 2016 Available at: http://msdn.microsoft.com/en-us/library/dn133176.aspx, 5 pages.

Mordkovich, Alex, "RDMA in RAMCloud", Retrieved on: Jan. 11, 2016, Available at: https://ramcloud.atlassian.net/wiki/download/attachments/6848659/rdma_slides.pdf?version=1&modificationDate=1339212592571&api=v2, 32 pages.

Muhleisen, et al., "Peak Performance—Remote Memory Revisited", In Proceedings of Ninth International Workshop on Data Management on New Hardware, Jun. 24, 2013, 7 pages.

Ongaro, et al., "Fast crash recovery in RAMCloud", In Proceedings of the Twenty-Third ACM Symposium on Operating Systems Principles, Oct. 23, 2011, pp. 29-41.

"Oracle's Technical Contributions to Linux", Published on: Dec. 14, 2012, Available at: http://www.oracle.com/technetwork/server-storage/linux/technical-contributions-1689636.html, 4 pages.

"Query Memory Resource Notification function", Retrieved on: Jan. 11, 2016 Available at: https://msdn.microsoft.com/en-us/library/windows/desktop/aa366799(v=vs.85).aspx, 2 pages.

Recio, et al., "A Remote Direct Memory Access Protocol Specification", Published on: Oct. 2007, Available at: http://www.rfc-editor.org/rfc/rfc5040.txt, 57 pages.

Rodiger, et al., "High-Speed Query Processing over High-Speed Networks", In Proceedings of the VLDB Endowment, vol. 9, Issue 4 , Dec. 2015, pp. 228-239.

"Server Message Block", Retrieved on: Jan. 11, 2016, Available at: https://en.wikipedia.org/wiki/Server_Message_Block, 10 pages.

Seshadri, et al., "Generalized Partial Indexes", In Proceedings of the Eleventh International Conference on Data Engineering, Mar. 6, 1995, 8 pages.

"SQLIO Disk Subsystem Benchmark Tool", Published on: Dec. 11, 2015, Available at: https://www.microsoft.com/en-us/download/details.aspx?id=20163, 8 pages.

Stonebraker, Michael, "The Case for Partial Indexes", In Journal of SIGMOD Record, vol. 18, Issue 4, Dec. 4, 1989, 8 pages.

Storm, et al., "Adaptive Self-Tuning Memory in DB2", In Proceedings of the 32nd International Conference on Very Large Data Bases, Sep. 12, 2006, pp. 1081-1092.

Subramaniam, "Exadata Smart Flash Cache Features and the Oracle Exadata Database Machine", An Oracle White Paper, Dec. 2013, 15 pages.

"Supplement to InfiniBand Architecture Specification vol. 1 Release 1.2.1", Published on: Apr. 6, 2010 Available at: https://cw.infinibandta.org/document/dl/7148, 19 pages.

"Tempdb Database", Retrieved on: Jan. 11, 2016, Available at: https://msdn.microsoft.com/en-us/library/ms190768.aspx, 5 pages.

"Teradata Aster Big Analytics Appliance", Retrieved on: Jan. 11, 2016, Available at: http://in.teradata.com/Aster-Big-Analytics-Appliance/?LangType=16393&LangSelect=true#tabbable=0&tab1=0&tab2=0, 5 pages.

"Teradata Selects Mellanox Technologies's InfiniBand Interconnect Solution", Published on: Dec. 19, 2012, Available at: http://cloud-computing.tmcnet.com/news/2012/12/19/6804961.htm, 2 pages.

"TimesTen In-Memory Database and TimesTen Application-Tier Database Cache", Retrieved on: Jan. 11, 2016, Available at: http://www.oracle.com/technetwork/database/database-technologies/timesten/overview/index.html, 2 pages.

"TPC-C V5", Retrieved on: Jan. 11, 2016, Available at: http://www.tpc.org/tpcc/, 2 pages.

"TPC-DS", Retrieved on: Jan. 11, 2016, Available at: http://www.tpc.org/tpcds/, 2 pages.

\* cited by examiner

MEMORY SHARING FOR WORKING DATA USING RDMA

BACKGROUND

Large scale network service providers often utilize multiple server computers to respond to network requests from users and client devices. In many cases, the server computers administer and interact with databases using relational database management systems (RDBMSs). A typical Internet web site may be supported by hundreds or thousands of physical or virtual server computers and corresponding RDBMSs, which may be part of a server farm or data center in which the server computers are connected to each other using high-speed local-area networking (LAN) technologies.

Memory is an important resource for an RDBMS. When there is insufficient main memory, an RDBMS is forced to use relatively slow mass media storage devices such as hard disk drives (HDDs) or solid-state drives (SSDs), which can result in significant performance degradation.

SUMMARY

This disclosure describes systems and methods for utilizing otherwise unused memory of server computers. In a described embodiment, a server computer utilizes a hierarchy of memory types for temporary data such as for buffers and caches. The memory types include (a) local RAM of the server computer, which is referred to as the main memory of the server computer; (b) shared main memory of another server computer that is accessed using remote direct memory access (RDMA); and (c) non-volatile mass storage such as hard disk drives (HDDs) or solid-state drives (SSDs).

In certain embodiments, the server computer may run a relational database management system (RDBMS), which manages a database and processes database queries. The RDBMS is configured to use local main memory for temporary storage of data relating to database queries. When the local main memory becomes depleted, however, the RDBMS requests an allocation of main memory from a different computer and uses the allocated memory for temporary data storage. The allocated memory may be accessed using RDMA techniques, which may include the use of RDMA network interfaces.

In certain embodiments, a system may include a memory broker that keeps track of memory that has been made available by different computers and memory that has been assigned for use by various computers. An RDBMS or application running on a particular computer may contact the memory broker to request an allocation of memory from another computer.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Overview

Many websites and other online services are supported by backend databases. Databases such as these may be maintained and managed by multiple server computers, which may be part of a data center or server farm. One or more of the server computers may run a relational database management system (RDBMS) for management of a corresponding database. Each server computer may also run an application that utilizes the RDBMS to access the database and to provide functionality that is particular to the purpose of the service being provided.

The RDBMS running on a particular computer utilizes local, volatile main memory of the computer, such as randomly-accessible memory (RAM) of the computer, to store temporary data such as caches, buffers, intermediate results, etc. However, local RAM is a limited resource. When local RAM is depleted, the RDBMS is instead forced to use non-volatile mass storage, such as hard disk drives (HDDs) or solid-state drives (SSDs), which are much slower than local RAM.

An embodiment of an RDBMS as described herein utilizes remote direct memory access (RDMA) to provide an intermediate type of storage for temporary data, wherein this intermediate type of storage has access speeds that are between those of local RAM and non-volatile mass storage. When available local RAM becomes limited, the RDBMS obtains an allowance of remote RAM and uses the remote RAM for storage of certain types of temporary data. This enhances performance of the RDBMS because the RDBMS is not as frequently forced to use non-volatile mass storage devices for storage of temporary data.

RDMA Memory Sharing

Figure 1:
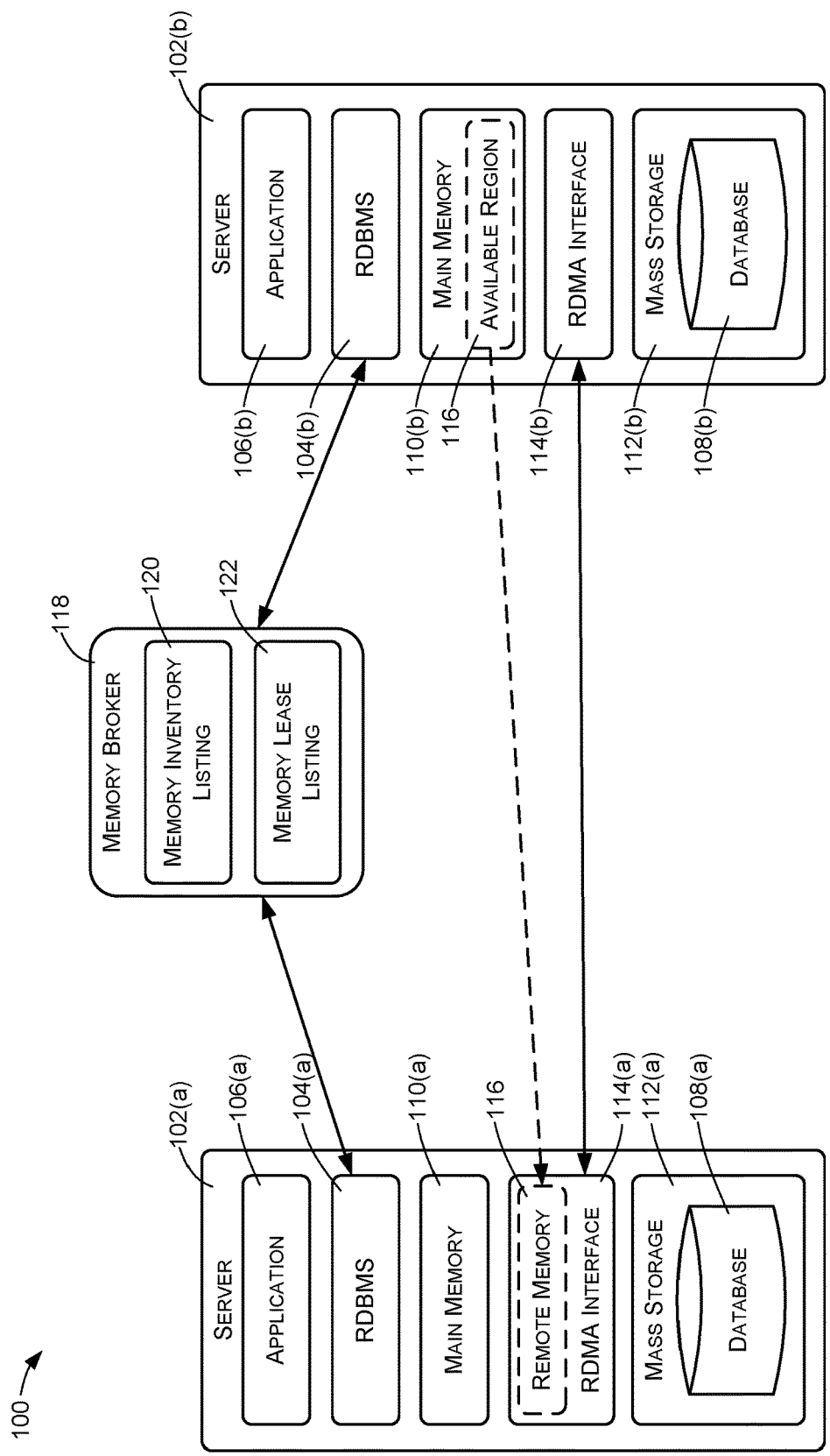
FIG. 1 is a block diagram of a server system in which local main memory can be shared among servers.

FIG. 1 shows high-level components of a database system 100 in which the described techniques may be used. The database system 100 may, as an example, support a large-scale Internet web site. During its operation, the database system 100 may analyze queries in order to respond to requests received from web site clients such as Internet browsers.

The database system 100 comprises multiple database servers 102, each of which may comprise a physical computer or a virtualized computer. Although only two servers 102(a) and 102(b) are shown in FIG. 1, the servers 102 may be part of a datacenter or server farm that houses many server computers. Such a datacenter may provide high-speed local-area networking between the servers 102, allowing the servers 102 to communicate with each other at relatively high speeds. As will be described in more detail, the local-area networking may be implemented so as to allow remote direct memory access (RDMA) between the servers 102.

In the illustrated example, one or more of the servers 102 has a relational database management system (RDBMS) 104, which may also be referred to as a relational database engine. One or more of the servers 102 also has an application 106 that utilizes the RDBMS 104 to provide services that are specific to the purpose of the system 100. The application 106 and the RDBMS 104 within a server 102 communicate with each other using function calls and/or application programming interfaces (APIs).

The application 106 uses the RDBMS 104 to manage and access a relational database 108. The relational database 108 contains tables, queries, and/or other data that is defined and provided by the application 106. In order to provide data to requesting clients, the application 106 submits queries to the RDBMS 104. The RDBMS 104 accesses the database 108 to evaluate the queries and returns the resulting data to the application 106.

In some embodiments, the same application 106 may be executed by each of the servers 102. Similarly, the databases 108 of each server 102 may be the same. For example, the databases 108 may have the same logical structure and organization, and may be synchronized using network communications so that they represent the same data. In other embodiments, the applications 106 and RDBMSs 104 of the different servers 102 may access a common database that is stored on one of the servers 102 or on one or more other servers that are dedicated to database storage. In yet other embodiments, each of the servers 102 may run a unique application 106 and may utilize a respectively corresponding database 108. That is, each server 102 may be responsible for a different application, and each application may use a uniquely corresponding database. Generally, the database may be on the same server as its application or may be on a different device.

In FIG. 1, both of the illustrated servers 102 are shown as having a corresponding RDBMS 104, application 106, and database 108. However, the described techniques may be used in situations in which one or more servers 102 have RDBMSs while others do not. That is, non-database servers that do not have RDBMSs may share their available memory with RDBMSs of database servers, and an RDBMS may utilize memory that is shared by any other computer, regardless of whether the other computer is a database server, runs an RDBMS, has an application 106, or has a database 108.

Furthermore, although various techniques are explained herein with reference to a relational database system, it is to be understood that various aspects of the described techniques may be utilized in different environments, including in conjunction with non-relational database systems and other types of systems that may or may not include relation databases or other databases.

Each server 102 main memory 110 that is local to the server itself and that is sometimes referred to as "main" memory. The main memory 110 typically comprises volatile memory such as electronic, high-speed, randomly-addressable memory (RAM).

Each server also has or is able to access mass storage 112. The mass storage 112 typically comprises non-volatile memory such as one or more hard disk drives (HDDs), solid state drives (SSDs), or various forms of magnetic, optical, or rotating storage media that have slower access speeds than the main memory 110. The mass storage 112 may be organized using a file-oriented structure, as opposed to the random-access memory organization of the main memory 110. The mass storage 112 may be local to a particular server 102 or may comprise storage that is hosted by another network-accessible server or device, and may include what is often referred to as network-attached storage (NAS). The database 108 typically resides in the mass storage 112.

The RDBMS 104 of a particular server is designed to utilize both the main memory 110 and the mass storage 112 of the server to temporarily store working data such as various types of buffers, caches, intermediate results, and other data, where the working data comprises data that is dynamically created and destroyed during operation of the application 106 and the RDBMS 104. When possible, the main memory 110 is used for such data because of the higher speed performance of the main memory 110 in comparison to the mass storage 112. The main memory 110 is a limited resource, however, and may become depleted. In this case, the RDBMS 104 has mechanisms for instead using the slower mass storage 112 for temporary storage of working data. Responsiveness of the RDBMS 104 is typically degraded significantly when it is forced to use the mass storage 112 instead of the main memory 110.

Each of the servers 102 has a remote direct memory access (RDMA) network interface 114, often referred to as a network interface card (NIC), so that each server 102 can share its main memory 110 with other servers and can also access the main memory 110 of the other servers 102. Data transfers using RDMA utilize the high-speed networking that is available in many data centers to perform zero-copy transfers, i.e., transfers that do not involve the CPU of the servers, at relatively high data transfer speeds. RDMA enables efficient, low-latency, and high-throughput reads and writes of remote memory, bypassing the operating system kernel at both the source and destination. Since the CPUs of the servers are not involved in data transfers, RDMA avoids context switches and processor cache pollution, and therefore incurs negligible performance impact on either the local or the remote servers. Accordingly, accessing the main memory of another server using RDMA, while slower than accessing local main memory, is faster than accessing non-volatile mass storage.

For purposes of discussion, the main memory 110 of a first server or computer will be referred to as being "local" to the first server or computer. For example, the first server 102(a) has local main memory 110(a). The second server 102(b) has local main memory 110(b). Main memory of a second server or computer, which is accessed by the first server or computer using RDMA, will be referred to as "remote" memory with respect to the first server or computer.

A given server 102 may utilize three types of memory: (a) local main memory; (b) remote memory that is accessible using RDMA; and (c) non-volatile mass storage. The local main memory can be accessed at higher access speeds than the remote memory. The remote memory, while slower than the local main memory, can be accessed at higher access speeds than the mass storage.

In FIG. 1, it is assumed that the second server 102(b) has a memory region 116, of its local main memory 110(b), that is not currently being utilized by the RDBMS 104(b) of the second server 102(b) and that is not being otherwise used by the second server 102(b). The first server 102(a) is shown as having access to this region 116, which is referred to as remote memory 116 from the perspective of the first server 102(a). The first server 102(a) accesses the remote memory 116 through its RDMA network interface 114(a) and through the RDMA network interface 114(b) of the second server 102(b).

Note that although the system 100 has been described in terms of servers that each have relational database capabilities, in some embodiments the second server 102(b) (or other servers that share their local memory) may not have such database capabilities and rather may perform other functions. The second server 102(b) may nevertheless be configured to share its local memory in the manner described herein, and the shared memory may be accessible to and be used by the RDBMS 104(a) of the first server 102(a).

The first server 102(a) may use the remote memory 116 to temporarily store various types of working data, such as caches, tables, table variables, cursors, buffer pools, indexes, materialized views, intermediate results, and so forth. In general, each RDBMS 104 is configured to utilize its local main memory 110 for such temporary data when such local main memory 110 is available. When there is insufficient local main memory 110, however, the RDBMS 104 is configured to obtain usage of remote memory from another server and to use such remote memory for supplemental, temporary, volatile storage of working data.

Several specific examples of using remote RDMA memory are described herein. These examples include (a) extending RDBMS caches; (b) spilling temporary data; (c) supporting a semantic cache; and (d) leveraging fast memory-to-memory transfer to prime and warm-up a buffer pool of a database that has been newly elected as a primary server. The first three examples leverage remote memory as an additional level in a memory hierarchy of the RDBMS, where the performance of the remote memory lies between that of local main memory and that of mass storage. Specifically, such a memory hierarchy comprises, in order of speed from highest to lowest, (a) local main memory, (b) remote memory accessed through RDMA, and (c) mass storage.

In some embodiments, the system 100 may also include a memory broker 118 to coordinate memory sharing among different servers. The memory broker 118 may maintain a memory inventory listing 120 and a memory lease listing 122. These components will be discussed in a subsequent part of this description.

Figure 2:
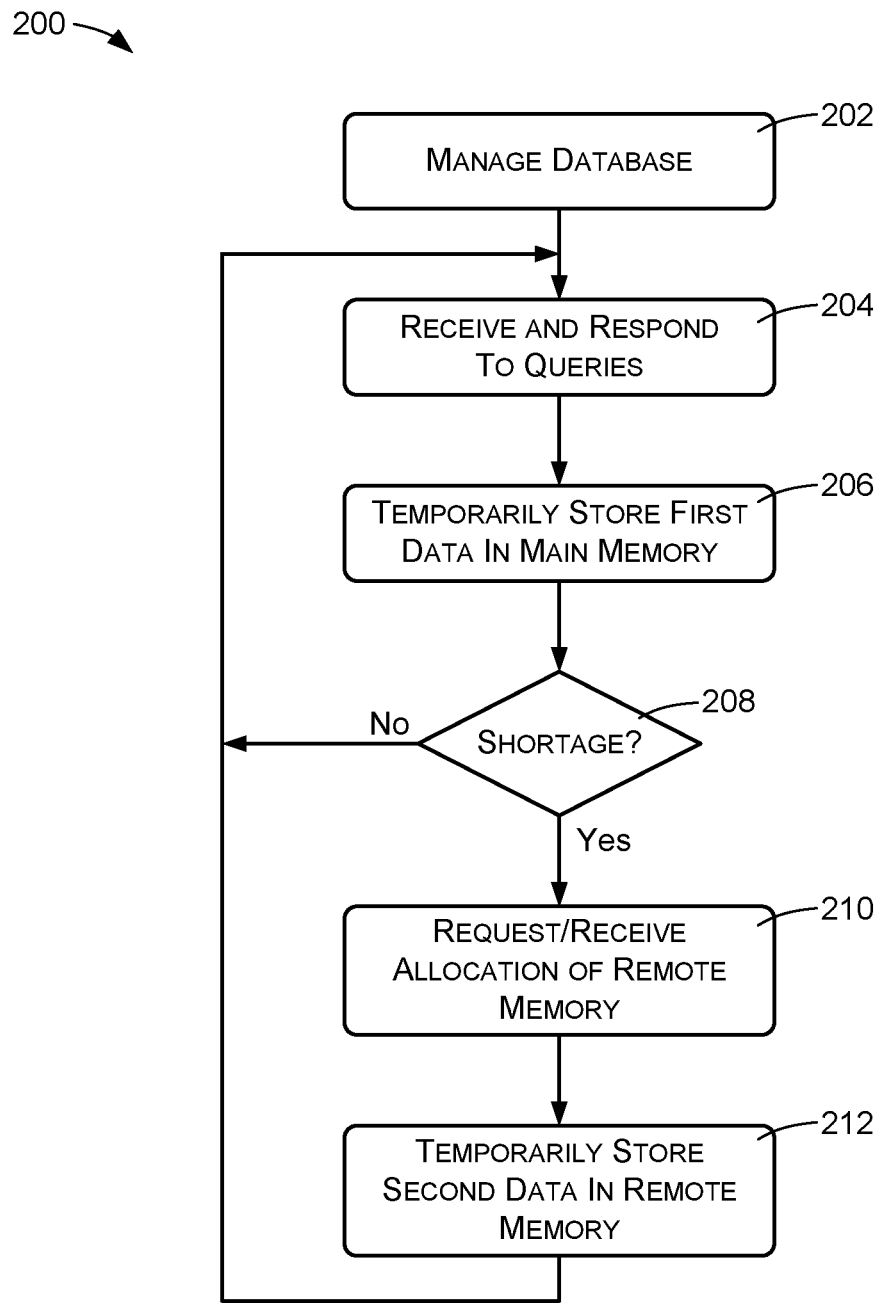
FIG. 2 is a flow diagram illustrating an example method of sharing local memory among servers.

FIG. 2 illustrates an example method 200 of utilizing remote memory. In the context of the system 100 of FIG. 1, the method 200 may be performed or used by the RDBMS 104(a) of the first server 102(a).

The RDBMS 104(a) may be configured to utilize three types of memory for temporary storage of working data, wherein the three types of memory comprise (a) RAM or other local main memory of the first server 102(a); (b) remote RAM or other remote main memory of a second computer 102(b) that is accessible using RDMA communications; and (c) the non-volatile mass storage 112(a).

An action 202 comprises managing a database 108(a) that resides on one or more mass storage devices or other types of relatively slow mass storage 112(a) associated with the first server 102(a).

An action 204 comprises receiving and responding to database queries. For example, queries may be received from an application 106(a) that executes on the first server 102(a) and that communicates with the RDBMS 104(a).

An action 206 comprises temporarily storing first data related to the received database queries in the main memory 110(a) of the first server 102(a). The first data may comprise various types of buffers, caches, intermediate results, materialized views, and so forth. The action 206 may comprise obtaining local main memory allocations from the first server 102(a) as the need for temporary data storage varies. Obtaining local memory allocations may involve interacting with operating system components of the first server 102(a).

An action 208 comprises detecting a shortage or depletion of the main memory 110(a) of the first server 102(a), such as a situation in which performance of the RDBMS 104(a) would benefit from additional high-speed main memory that is not available from the first server 102(a).

If there is not a shortage of local main memory, execution returns to the action 204 of receiving and responding to database queries, and the action 206 of storing temporary working data in the main memory 110(a) of the first computer. If there is a shortage of local main memory, an action 210 is performed of requesting and receiving an allocation of remote memory 116, where the remote memory 116 is available from a second server 102(b) and is accessible using the RDMA interfaces 116(a) and 116(b) of the first server 102(a) and the second server 102(b), respectively. In some embodiments, the action 210 may comprise communicating with the memory broker 118 to request the allocation of the remote memory 116, where the memory broker 118 oversees sharing of memory among multiple networked computers.

After obtaining an allocation of remote memory in the action 210, an action 212 is performed of temporarily storing second working data in the remote memory 116 using RDMA communications and using the RDMA interfaces 116(a) and 116(b) of the first and second servers 102(a) and 102(b), respectively.

Memory Broker

Returning now to FIG. 1, the variety and non-uniformity of workloads and resource demands at any point in time may cause memory usage within a particular server 102 to vary over time. Furthermore, main memory usage may vary significantly from one server to another. For example, one server may experience memory pressure, i.e., demand exceeds available main memory, while another server might have large amounts of unused main memory.

In order to facilitate and manage memory sharing among different servers, the system 100 may include a memory broker 118. The memory broker 118 may comprise a software component that executes on one of the servers 102 or that executes on a different, dedicated server. Each of the RDBMSs 104 communicates with the memory broker 118 using network communications and appropriate application programming interfaces (APIs) (not shown).

In use, the RDBMS 104 of each server 102 keeps track of used and unused main memory 110 and reports regions of unused memory to the memory broker 118. The memory broker 118 maintains a memory inventory listing 120 containing entries corresponding to respective regions of available main memory 110, which may be available from any of the servers 102 within the system 100. In an example implementation, for each available memory region, the corresponding entry indicates the network address of the server 102 from which the memory block is available. The entry may also indicate the local address of the memory region and/or other information that allows other servers 102 to access and use the memory region.

In the example of FIG. 1, it is assumed that the second RDBMS 104(b) has communicated with the memory broker 118 to report the availability of the region 116 that is within the local main memory 110(b) of the second server 102(b).

Note that in some embodiments the second server 102(b) may not be a database server and may not have an RDBMS 104, associated application 106, or database 108. Nevertheless, the second server 102(b) may run a process in place of the RDBMS 104(b) that tracks available main memory, registers the available memory with the memory broker 118, and performs other memory management functions as described below in order to share its available memory with the first server 102(a) through communications with the memory broker 118.

The RDBMS 104 of each server 102 also detects conditions under which the RDBMS 104 may benefit from having the use of remote memory, such as when there is a shortage of available local main memory 110 of the server 102. Upon detecting a need for additional temporary memory, a server 102 communicates with the memory broker 118 to request an allocation of remote memory. The request may, in some cases, indicate an amount or size of memory that is being requested.

In response to receiving a request for remote memory, the memory broker 118 examines its memory inventory listing 120 to determine if any other servers have indicated the availability of one or more sharable memory regions. Assuming that the memory inventory listing 120 indicates the availability of remote memory, the memory broker 118 allocates one or more memory regions to the requesting server. The memory broker 118 may maintain a memory lease listing 122 containing entries corresponding to memory blocks that have been leased to requesting servers. Alternatively, the memory inventory listing 120 may be annotated or flagged to indicate the allocations of memory regions.

In the example of FIG. 1, it is assumed that the first RDBMS 104(a) has communicated with the memory broker 118 to request remote memory, and that the memory broker has allocated or leased the memory region 116 to the requesting first RDBMS 104(a).

The memory broker 118 may have various mechanisms for monitoring available RDMA memory and for arbitrating memory allocations among multiple requesting servers 102. Furthermore, a first server whose memory has been allocated to a second server may subsequently indicate that the memory is no longer available, and may request that the memory broker 118 de-allocate the memory so that the first server can again make full use of its own primary memory. Similarly, a server to which memory has been leased may release its lease on a region of remote memory, so that the remote memory can subsequently be leased to other servers.

Figure 3:
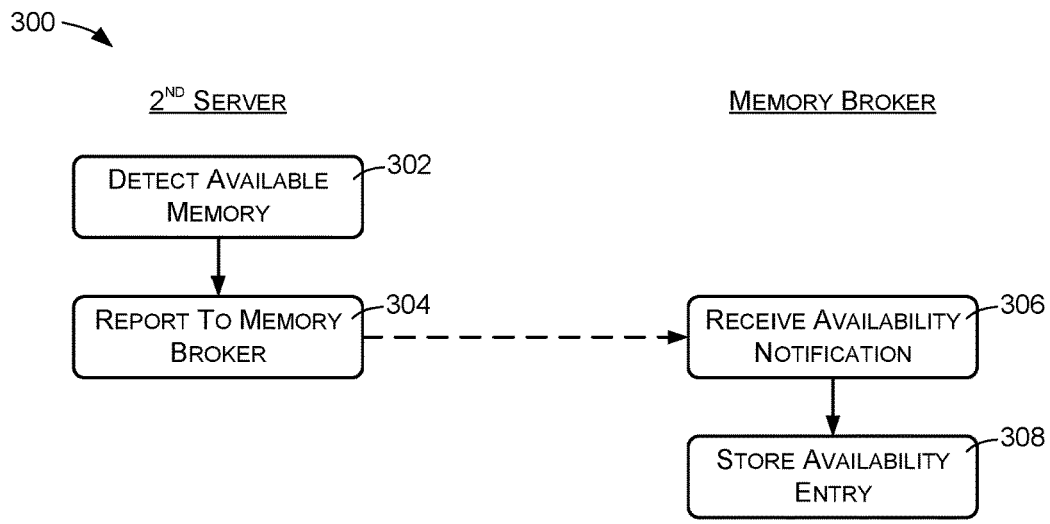
FIG. 3 is a flow diagram illustrating an example method of offering available memory for sharing among servers.

FIG. 3 illustrates an example method 300 of making local memory available to other servers as remote memory using a memory broker. In the context of the system shown in FIG. 1, actions on the left side of FIG. 3 are performed by the second server 102(b) and/or by the RDBMS 104(b) of the second server 102(b). Actions on the right side of FIG. 3 are performed by the memory broker 118. For purposes of discussion, the second server 102(b), which offers or grants its local memory region 116 for remote access by another server, will be referred to as a granting server 102(b). In practice, any server may at times act as a granting server. Note that the functions of the second server 102(b) may be performed by any server having RDMA capabilities, regardless of whether the server functions as a database server.

An action 302, performed by the granting server 102(b) and/or the RDBMS 104(b) of the granting server 102(b), comprises detecting that there is unused and available local memory within the local main memory 110(b) of the granting server 102(b). For example, the action 302 may comprise determining that the local memory region 116 is unused and is available for use by other servers through RDMA.

An action 304, also performed by the granting server 102(b) and/or the RDBMS 104(b), comprises reporting unused main memory of the granting server 102(b) to the memory broker 118 for allocation to other servers or computers. More specifically, the action 304 may comprise communicating with the memory broker 118 and providing a notification to the memory broker 118 regarding the availability of RDMA accessible memory, such as the available memory region 116.

The RDBMS 104(b) and/or the granting server 102(b) may communicate with the memory broker 118 using local-area networking and using network-accessible APIs of the memory broker 118. The communication to the memory broker 118 may indicate address information regarding the available memory region 116. The communication may also indicate policies such as a time or duration that the memory region 116 will be available and/or how many accesses per second are to be allowed on the memory region 116.

An action 306, performed by the memory broker 118, comprises receiving the notification from the granting server 102(b) regarding the available memory region 116 of the granting server 102(b). More generally, this action may comprise communicating with one or more granting servers 102 and/or RDBMSs 104 to identify local memory of the granting servers that is available for remote use through RDMA.

An action 308, performed by the memory broker 118 in response to receiving the notification from the granting server 102(b), comprises storing a corresponding entry in the memory inventory listing 120, indicating the availability of the memory region 116.

The example method 300 may be iterated many times, with different granting servers providing notifications regarding different regions of memory as the regions become available for use and sharing. Each granting server may also communicate with the memory broker 118 regarding previously available memory that is no longer available, and the memory broker 118 may respond by removing the corresponding entry from the memory inventory listing 120.

Figure 4:
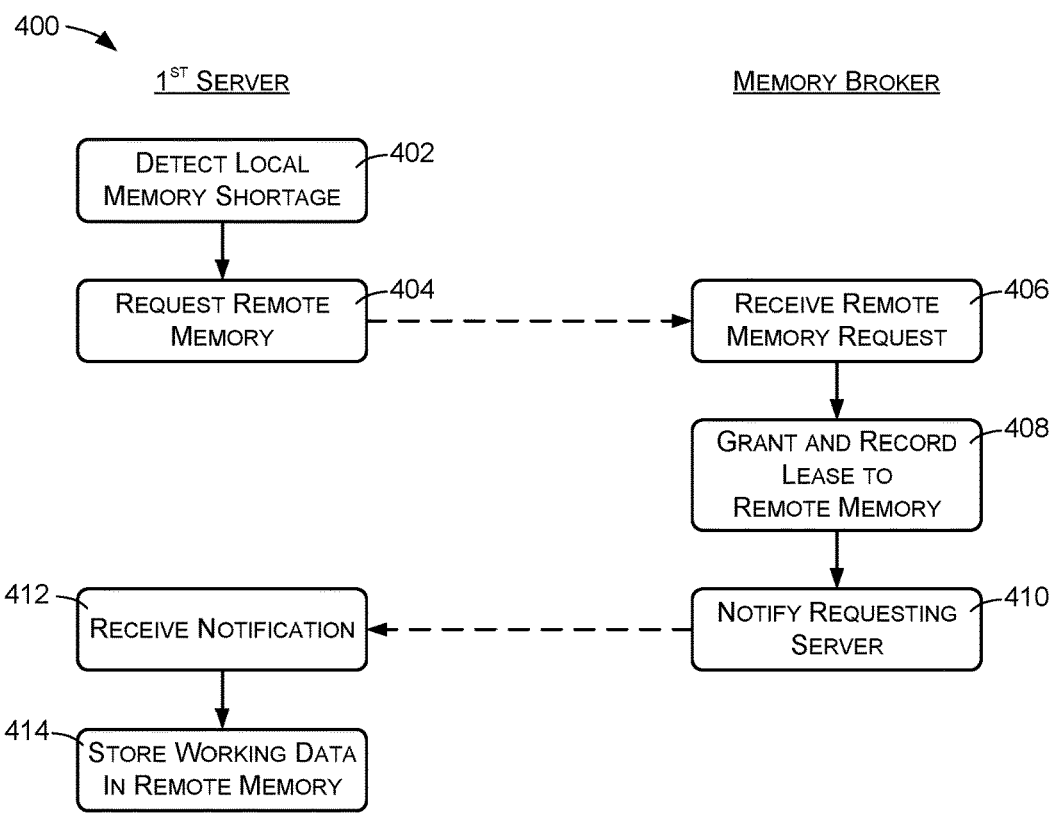
FIG. 4 is a flow diagram illustrating an example method of allocating memory for sharing among servers.

FIG. 4 illustrates an example method 400 of making local memory of different granting servers available to requesting servers using a memory broker. In the context of the system shown in FIG. 1, actions on the left side of FIG. 4 are performed by the first server 102(a) and/or the RDBMS 104(a) of the first server 102(a). Actions on the right side of FIG. 4 are performed by the memory broker 118. The first server 102(a) will be referred to as the requesting server 102(a).

An action 402, performed by the requesting server 102(a), comprises detecting a shortage or depletion of local main memory and/or detecting a need for high-speed memory that exceeds the amount of available local main memory.

An action 404, performed in response to detecting the depletion of local main memory, comprises sending a remote memory request to the memory broker 118. The remote memory request may indicate an amount of requested memory and may indicate other information. The remote memory request may indicate policies such as a length of time during which the memory is needed, in order to help the memory broker 118 determine which blocks to provide. Policies may also specify access patterns, such as whether the memory will be used for a buffer pool that involves short random accesses or for temporary working memory that involves scan-oriented high bandwidth accesses. If the granting server has corresponding policies, the memory broker 118 can match policies when identifying memory for sharing to the requesting server.

An action 406, performed by the memory broker 118, comprises receiving the remote memory request from the requesting server 102(a) and/or the RDBMS 104(a) of the requesting server 102(a).

An action 408 comprises allocating a region of remote local memory to the requesting server 102(a). The action 408 may comprise examining the memory inventory listing 120 to identify a suitable region of memory that has been indicated as being available for RDMA sharing by a granting server. The action 408 may further comprise granting a lease to the requesting server 102(a) of a memory region that is available from the granting server 102(b). The action 408 may also comprise recording the grant of the allocated region of remote memory in the memory lease listing 122.

An action 410 comprises notifying the requesting server 102(a) of the newly granted remote memory. The notification may indicate a granting server address and other information that may be needed by the requesting server 102(a) to access the remote memory. The notification may indicate whether policies were satisfied and if not, which policies were not satisfied.

An action 412, performed by the requesting server 102(a), comprises receiving the notification from the memory broker 118.

An action 414 comprises accessing and using the granted remote memory using the RDMA interfaces 114 of the requesting server 102(a) and the granting server 102(b). The action 414 may include storing various types of temporary data for use by the RDBMS 104(a). As will be described in more detail below, the action 414 may comprise storing one or more of the following types of temporary data in the remote memory 116: buffer pools, caches, secondary cashes, semantic caches, tables, table variables, indexes, materialized views, cursors, intermediate results, etc.

Cache Extension

As one example of utilizing remote RDMA accessible memory, the RDBMS 104 may be configured to use the remote memory 116 for various types of caches. Caches may include, for example, buffer pool caches and procedure caches. Buffer pool caches temporarily store table and index data. Procedure caches store optimized query plans and partial execution results.

A cache may be maintained in the local main memory 110 of the server 102(a). When the size of a cache becomes so large that it comes near to exceeding the remaining available local main memory 110(a), the RDBMS 104 evicts entries from the cache in order to accommodate new entries. Instead of discarding an evicted entry, the entry can be secondarily cached in the remote memory 116, which is much faster for both sequential and random accesses compared to reading the entry from the mass storage 112.

Figure 5:
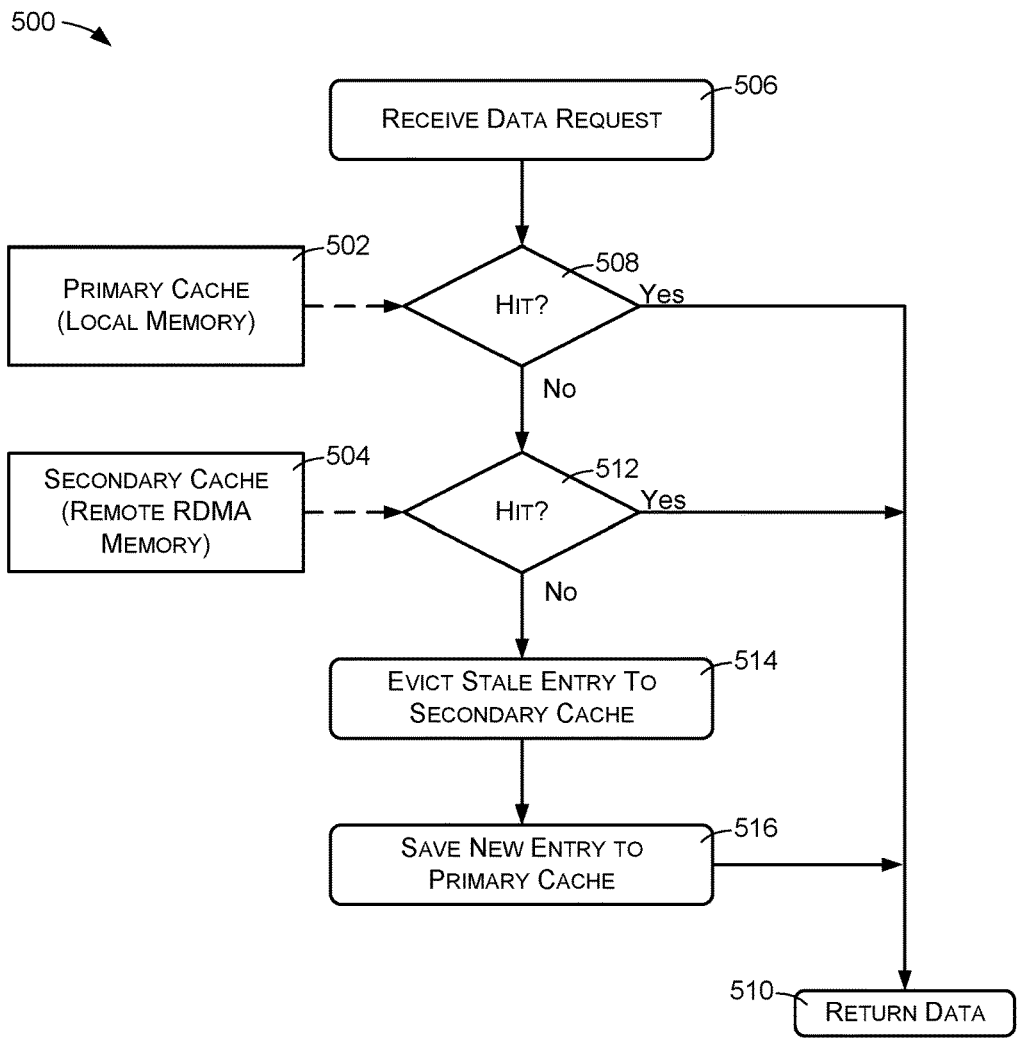
FIG. 5 is a flow diagram illustrating an example method of using shared memory for secondary caching.

FIG. 5 illustrates an example method 500 of using a primary cache 502 and an associated secondary cache 504. In the context of FIG. 1, the server 102(a) maintains the primary cache 502 in the local main memory 110(a). The server 102(a) maintains the secondary cache 504 in the allocated remote memory 116. Each of the primary cache 502 and the secondary cache 104 can have multiple entries. The example method 500 may be performed by the RDBMS 104(a).

An action 506 comprises receiving a data request. An action 508 comprises checking the primary cache 502 to determine if the primary cache 502 has an entry that can be used to fulfill the data request. If the primary cache 502 has the entry, which is referred to as a cache hit, an action 510 is performed of returning the data, in this case from the primary cache 502. If a primary cache miss is detected, corresponding to the situation in which the primary cache 502 does not have the entry, an action 512 is performed. The action 512 comprises checking the secondary cache 504 to determine if the secondary cache 504 has an entry corresponding to the requested data. If the secondary cache 504 has the data, the action 510 is performed of returning the data, in this case from the secondary cache 504. If the secondary cache 504 does not have the entry, an action 514 is performed of evicting a stale entry from the primary cache 502 to make room for a new entry, and saving the evicted entry in the secondary cache 504.

A subsequent or concurrent action 516 comprises obtaining or creating the requested data and creating a corresponding new entry in the primary cache 502. The data is then returned from the primary cache 502 in the action 510.

Spilling Data for Memory Intensive Operations

As another example of utilizing remote memory through RDMA, the RDMS 104 may generate a significant amount of temporary data during the execution of complex queries. Examples of such data include user-generated temporary objects such as tables, table variables, or cursors. Data such as this may also include system-generated temporary structures and data, including, for example, intermediate results from data-intensive operations such as sorting and hashing. Depending on the workload, the size of such temporary data needed during query execution can be significant. In the situation where enough local main memory 110 is not available, the RDBMS 104 can spill the data to the remote memory 116 rather than to mass storage 112, thereby providing faster access speeds for the data than would otherwise be available.

Semantic Caches

As another example of using RDMA in a database environment, remote memory shared through RDMA may be used for semantic caches, which are used to speed up query execution. Semantic cashes store the result of an SQL (Structure Query Language) expression, support a standard SQL interface, and when possible answer application queries by using results from the cache. If the query cannot be answered from the cache, the query is routed to the database engine for execution.

When the remote memory 116 is available, it is possible for the RDBMS 104 to perform seamless semantic caching, without relying on the application 106 to create application-specific semantic caches. Specifically, the RDBMS 104 can create specialized redundant structures, keep them pinned in the remote memory 116, and access the structures via RDMA when queries matching such structures are executing. Examples of data structures that can be used as semantic caches include, but are not limited to, non-clustered indexes, partial indexes, and materialized views. These types of structures can be lazily built and maintained since they are redundant. Structures like this can be built opportunistically when remote memory is available.

Semantic caches can be updated based on policies specified by the application 106. The semantic caches can be updated in-sync with transactions, updated asynchronously, maintained as snapshots, and/or invalidated with updates.

Remote memory failures can be dealt with in various ways. One approach is to invalidate the cache upon failure of the remote memory. An alternative is to leverage the RDBMS transaction log and to use redo logic to recover the structures by replaying the log on another server with available memory.

Buffer Pool Priming

As yet another example of using RDMA in the context of database management, there may arise situations in which a replicated database server is newly designated as a primary replicated server. When this happens, the buffer pools of the newly designated primary server are "cold", and performance of the database can be impaired until such time as the buffer pools are filled with relevant data. When RDMA is available, however, RDMA memory access may be used to prime the buffer pools of the newly designated primary server by copying the existing contents of the buffer pools from the previous primary, and now-secondary, replicated server using RDMA memory transfers.

Figure 6:
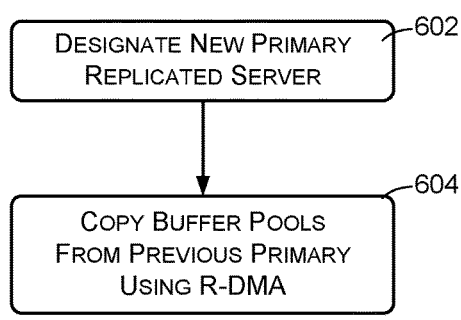
FIG. 6 is a flow diagram illustrating an example method of using shared memory for copying a buffer pool.

FIG. 6 illustrates an example method 600 of using RDMA communications for priming a buffer pool in this scenario. An action 602 comprises designating a new primary replicated server. An action 604, performed in response to designating the new primary server, comprises copying the content of one or more buffer pools from a previous primary server using RDMA.

Implementation Details

The described techniques may be implemented in a cluster of multiple servers that are able to utilize inter-server RDMA using high-speed local-area networking. Each server runs a memory brokering proxy process that determines available memory that is not committed to any local process. A server with available memory divides the available memory into configurable fixed-size memory regions (MRs). The server pins the available MRs, registers them to the local RDMA network interface, marks them unavailable from the perspective of the server's operating system, and registers the pinned MRs with the memory broker.

The memory broker tracks memory availability throughout the cluster. Conceptually, the memory broker controls the privilege to read from and write to the registered MRs, and can assign the privilege to any server with unmet memory demands.

Note that the granting server does not make available memory that is already committed to local processes. Furthermore, the local proxy process is configured to detect local memory pressure by receiving notifications from the server operating system. Upon detecting local memory pressure or depletion, the proxy process communicates with the memory broker to request deregistration of one or more MRs. Once the memory broker frees the lease on an MR, the MR is freed to the local OS, which can then allocate the memory to local processes.

A server with unmet memory demand can request from the memory broker a lease to a remote memory region. The lease provides the server with exclusive access to the region. The requesting server then communicates with the granting server using RDMA read/write commands. Because the memory broker is not in the data transfer path, the design can scale to thousands of servers.

A lease to a particular MR may have an expiration time, and the requesting server may need to renew the lease periodically. If the lease is successfully renewed, the server continues to use the MR. Otherwise, the requesting server is forced to release the MR. At this point, the server can request a lease on another MR or revert to mass storage. A server can also voluntarily release a lease on an MR if local main memory becomes available.

The system may utilize a light-weight application programming interface that exposes shared memory in a serialized fashion to emulate file-type data structures and accesses. For example, a requesting server that utilizes remote memory may have a serialization component that accesses the remote memory and that exposes a serialized, file-oriented API to the RDBMS of the requesting server. The serialization component may, as an example, receive a file "create" request. In response, the serialization component requests a lease on MRs corresponding to the requested file size and maps the MRs to file offsets. Upon receiving a file "open" request, the serialization component initiates connections and sets up RDMA flows to the granting servers of the leased and mapped MRs. Upon receiving a read or write request that specifies a file offset, the serialization component maps the file offset to the appropriate MR and to an offset within the MR. In the described embodiment, the lightweight API supports the following file-type operations: create, open, read, write, close, and delete.

Computer Device

Figure 7:
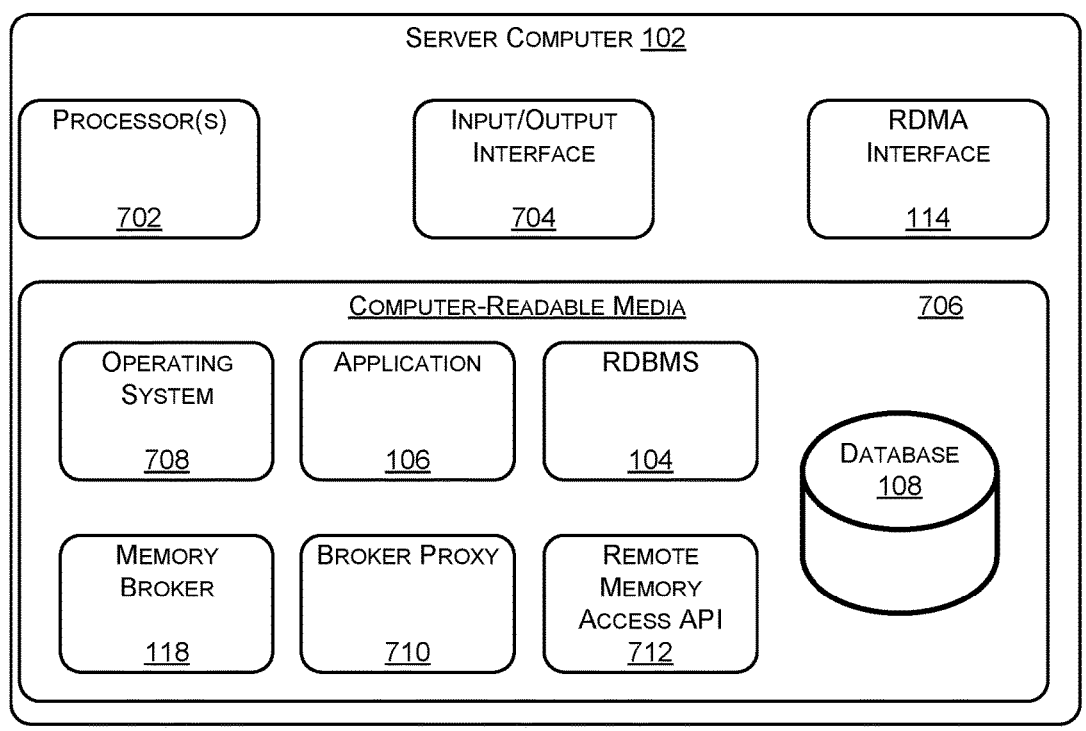
FIG. 7 is a block diagram illustrating high-level components of a server computer that may be used to implement servers of the system shown in FIG. 1.

FIG. 7 illustrates select components of an example server computer 102 configured to implement the memory sharing techniques described herein. The example computer 102 comprises one or more processors 702, an input/output interface 704, the RDMA network interface 114, and computer-readable media 706.

The processor 702 is configured to load and execute computer-executable instructions. The processor 702 can comprise, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

The input/output interface 704 allows the computer 102 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

The RDMA network interface 114 enables communications between the computer 102 and other networked devices such as other database servers. The RDMA network interface 114 can include, for example, one or more network interface controllers (NICs) or other types of transceiver devices to send and receive communications over a network. As described herein, the RDMA network interface 114 allows high-speed direct memory access between computers, without involving the processors 702 of the computers.

The computer-readable media 706 stores executable instructions that are loadable and executable by processors 702, wherein the instructions are designed to implement the memory sharing techniques described herein. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The computer-readable media 706 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in the computer 102, while in some examples one or more of a CPU, GPU, and/or accelerator is external to the computer 102.

The executable instructions stored by the computer-readable media 706 may include, for example, an operating system 708, the application 106 as well as any number of other applications, the RDBMS 104, the memory broker 118, and the database 108. The computer-readable memory 706 may include both the main memory 110 and the mass storage 112.

As illustrated in FIG. 7, the executable instructions may include the memory broker 118. Generally, the memory broker 118 may be implemented on a server that also serves as a database server. However, the memory broker 118 may also be implemented on a different, dedicated server that does not also incorporate database functionality.

The executable instructions may comprise a broker proxy 710 with which the RDBMS communicates to report and obtain shareable or shared memory. The broker proxy 710 is configured to monitor available memory and to manage local memory that is to be offered for use by other computers. The broker proxy 710 communicates with the memory broker 118 to report unused and available memory, and to request memory on behalf of the RDBMS.

The executable instructions may also comprise a remote memory access API 712 that the RDBMS calls to use remote memory. The remote memory access API 712 exposes leased remote memory as serialized file-type structures to the RDBMS 104, and allows the RDBMS to interact with remote memory as if it were interacting with a secondary memory file system.

The computer-readable media 706 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. The computer-readable media 706 may include tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media embodies computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The server computer 102 may represent any of a variety of categories or classes of devices, such as client-type devices, server-type devices, desktop computer-type devices, mobile-type devices, special purpose-type devices, embedded-type devices, and/or wearable-type devices. Examples may include, for example, a tablet computer, a mobile phone/tablet hybrid, a personal data assistant, laptop computer, a personal computer, other mobile computers, wearable computers, implanted computing devices, desktop computers, terminals, work stations, or any other sort of computing device configured to implement RDMA memory sharing as described herein.

Example Clauses

A: A method performed by a relational database engine of a first computer, the method comprising: detecting a depletion of memory of the first computer; communicating with a memory broker to receive an allocation of remote memory, wherein the remote memory comprises memory of a second computer that is accessible to the relational database engine using a remote direct memory access (RDMA) network interface of the first computer; accessing the remote memory through the RDMA network interface; and temporarily storing data in the remote memory for use by the relational database engine.

B: A method as Paragraph A recites, wherein detecting the depletion of memory comprises detecting depletion of randomly-accessible memory (RAM) of the first computer.

C: A method as Paragraph A or Paragraph B recites, further comprising maintaining a primary cache in the memory of the first computer, the primary cache having multiple entries; maintaining a secondary cache in the remote memory; evicting a first entry from the primary cache; writing the first entry to the secondary cache; detecting a primary cache miss for requested data; and in response to detecting the primary cache miss, checking the secondary cache for the requested data.

D: A method as any of Paragraphs A-C recite, the data comprising one or more of a table, a table variable, a cursor, a cache, a buffer pool, an index, a materialized view, or an intermediate result.

E: A method as any of Paragraphs A-C recite, the data comprising a semantic cache.

F: A method as any of Paragraphs A-E recite, further comprising, in response to being designated a primary replicated server, priming a buffer pool of the relational database engine by copying at least a portion of the buffer pool from remotely accessible memory through the RDMA network interface.

G: One or more computer-readable media comprising computer-executable instructions for performing the method as recited in any of Paragraphs A-F.

H: A system comprising: multiple servers; each of the servers having a respective remote direct memory access (RDMA) network interface; each of the servers having randomly-accessible memory (RAM) that is remotely accessible by others of the database servers through RDMA; a memory broker that performs actions comprising: (a) communicating with a first of the servers to identify a region of RAM of the first server that is unused; (b) receiving a remote memory request from a second of the servers; (c) in response to receiving the remote memory request, allocating the region of RAM of the first server for use by the database server; a relational database management system (RDBMS) that executes on the second server, the RDBMS utilizing at least three types of memory for temporary storage of data, the three types of memory comprising: (a) RAM of the second database server; (b) the allocated region of RAM of the first server; and (c) non-volatile mass storage; and the RDBMS being configured to access the allocated region of RAM of the first server using RDMA through the RDMA interface of the first server and the RDMA interface of the second database server.

I: A system as Paragraph H recites, the RDBMS being further configured to perform actions comprising: detecting depletion of the RAM of the second database server; and sending the remote memory request to the memory broker in response to detecting the depletion of the RAM of the second database server.

J: A system as Paragraph H or Paragraph I recites, the RDBMS being further configured to perform actions comprising: maintaining a primary cache in the RAM of the second database server, the primary cache having multiple entries; maintaining a secondary cache in the allocated region of RAM of the first database server; evicting a first entry from the primary cache; writing the first entry to the secondary cache; detecting a primary cache miss for requested data; and in response to detecting the primary cache miss, checking the secondary cache for the requested data.

K: A system as any of Paragraphs H-J recite, wherein the data comprises one or more of a table, a table variable, a cursor, or an intermediate result.

L: A system as any of Paragraphs H-K recite, the RDBMS being further configured to maintain a semantic cache in the allocated region of RAM of the first server.

M: A system as any of Paragraphs H-K recite, the RDBMS being further configured to maintain a semantic cache in the allocated region of RAM of the first server, wherein the semantic cache contains one or more of a non-clustered index, a partial index, or a materialized view.

N: A system as any of Paragraphs H-M recite, wherein the RDBMS is further configured to perform an action in response to being designated as a primary replicated server, the action comprising priming a buffer pool by copying at least a portion of the buffer pool from RAM of a secondary replicated server using RDMA.

O: A method comprising: managing a database that resides on one or more mass storage devices; receiving and responding to database queries; temporarily storing first data related to the database queries in local memory of the first computer; detecting depletion of the local memory of the first computer; in response to detecting the depletion of the local memory of the first computer, requesting an allocation of memory of a second computer; receiving the allocation of the memory of the second computer; and temporarily storing second data related to the database queries in the memory of the second computer.

P: A method as Paragraph O recites, further comprising accessing the memory of the second computer using remote direct memory access (RDMA) through an RDMA network interface of the first computer.

Q: A method as Paragraph O or Paragraph P recites, further comprising communicating with a memory broker to request the allocation of memory of the second computer.

R: A method as any of Paragraphs O-Q recite, further comprising reporting unused memory of the first computer to a memory broker for allocation to other computers.

S: A method as any of Paragraphs O-R recite, further comprising: maintaining a primary cache in the local memory of the first computer, the primary cache having multiple entries; maintaining a secondary cache in the memory of the second computer; evicting a first entry from the primary cache; writing the first entry to the secondary cache; detecting a primary cache miss for requested data; and in response to detecting the primary cache miss, checking the secondary cache for the requested data.

T: A method as any of Paragraphs O-S recite, the second data comprising one or more of a table, a table variable, a cursor, a cache, a buffer pool, an index, a materialized view, or an intermediate result.

U: A method as any of Paragraphs O-S recite, the second data comprising a semantic cache.

V: One or more computer-readable media comprising computer-executable instructions for performing the method as recited in any of Paragraphs O-U.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s), such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. The use or non-use of such conditional language is not intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to mean that an item, term, etc. may be either X, Y, or Z, or a combination of any number of any of the elements X, Y, or Z.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method performed by a relational database engine of a first computer, the method comprising: receiving a query for the relational database engine; executing the query; storing, as part of execution of the query, a first portion of working data in main memory of the first computer; detecting, during execution of the query, a depletion of the main memory of the first computer; requesting, from a memory broker, an allocation of remote memory based on the detecting the depletion of the main memory, wherein the requesting indicates a needed length of time for the remote memory and an access pattern for the remote memory, wherein the access pattern indicates the use of the remote memory as short random access or temporary working memory, wherein the remote memory comprises main memory of a second computer that is accessible to the relational database engine using a remote direct memory access (RDMA) network interface of the first computer; receiving, from the memory broker, a notification that the remote memory is allocated for the first computer, wherein the remote memory is available for at least the needed length of time and wherein a policy of the remote memory matches the access pattern; accessing, as part of execution of the query, the remote memory through the RDMA network interface, wherein the accessing is based on the access pattern; temporarily storing, as part of execution of the query, a second portion of the working data in the remote memory for use by the relational database engine: and returning query results based on the query.

2. The method of claim 1, further comprising:
maintaining a primary cache in the memory of the first computer, the primary cache having multiple entries;
maintaining a secondary cache in the remote memory;
evicting a first entry from the primary cache;
writing the first entry to the secondary cache;
detecting a primary cache miss for requested data; and
in response to detecting the primary cache miss, checking the secondary cache for the requested data.

3. The method of claim 1, the data comprising one or more of a table, a table variable, a cursor, a cache, a buffer pool, an index, a materialized view, or an intermediate result.

4. The method of claim 1, the data comprising a semantic cache.

5. The method of claim 1, further comprising, in response to being designated a primary replicated server, priming a buffer pool of the relational database engine by copying at least a portion of the buffer pool from remotely accessible memory through the RDMA network interface.

6. A system, comprising: multiple database servers; each of the database servers having a respective remote direct memory access (RDMA) network interface; each of the database servers having randomly-accessible memory (RAM) that is remotely accessible by others of the database servers through RDMA; a memory broker that performs actions comprising: communicating with a first of the database servers to identify a region of RAM of the first server that is unused; receiving a remote memory request from a second of the database servers, wherein the remote memory request indicates a needed length of time for the remote memory and an access pattern of the remote memory, wherein the access pattern indicates the use of the remote memory as short random access or temporary working memory; in response to receiving the remote memory request, allocating the region of RAM of the first server for use by the second database server, wherein the region of RAM of the first server is available for at least the needed length of time; a relational database management system (RDBMS) that executes on the second server, the RDBMS utilizing at least three types of memory for temporary storage of data, the three types of memory comprising: (a) RAM of the second database server; (b) the allocated region of RAM of the first server; and (c) nonvolatile mass storage; and the RDBMS being configured to; receive a query: execute the query; store, as part of execution of the query, a first portion of working data in RAM of the second computer; store, as part of execution of the query, a second portion of the working data in the allocated region of RAM of the first server; access, as part of execution of the query, the allocated region of RAM of the first server using RDMA through the RDMA interface of the first server and the RDMA interface of the second database server, wherein the access is based on the access pattern.

7. The system of claim 6, the RDBMS being further configured to perform actions comprising:
detecting depletion of the RAM of the second server; and
sending the remote memory request to the memory broker in response to detecting the depletion of the RAM of the second server.

8. The system of claim 6, the RDBMS being further configured to perform actions comprising:
maintaining a primary cache in the RAM of the second server, the primary cache having multiple entries;
maintaining a secondary cache in the allocated region of RAM of the first server;
evicting a first entry from the primary cache;
writing the first entry to the secondary cache;
detecting a primary cache miss for requested data; and
in response to detecting the primary cache miss, checking the secondary cache for the requested data.

9. The system of claim 6, wherein the data comprises one or more of a table, a table variable, a cursor, or an intermediate result.

10. The system of claim 6, the RDBMS being further configured to maintain a semantic cache in the allocated region of RAM of the first server.

11. The system of claim 6, the RDBMS being further configured to maintain a semantic cache in the allocated region of RAM of the first server, wherein the semantic cache contains one or more of a non-clustered index, a partial index, or a materialized view.

12. The system of claim 6, wherein the RDBMS is further configured to perform an action in response to being designated as a primacy replicated server, the action comprising priming a buffer pool by copying at least a portion of the buffer pool from RAM of a secondary replicated server using RDMA.

13. One or more non-transitory computer-readable media storing computer-executable instructions that, when executed by one or more processors of a first computer, cause the one or more processors to perform actions comprising: managing a database that resides on one or more mass storage devices; receiving and responding to database queries; executing a query; temporarily storing, as part of execution of the query, first data related to the database queries in local memory of the first computer; detecting, during execution of the query, depletion of the local memory of the first computer; in response to detecting the depletion of the local memory of the first computer, requesting an allocation of memory of a second computer, wherein the requesting indicates a needed length of time for the memory of the second computer and an access pattern for the memory of the second computer, wherein the access pattern indicates the use of the remote memory as short random access or temporary working memory; receiving the allocation of the memory of the second computer, wherein the memory of the second computer is available for the needed length of time; temporarily storing, as part of execution of the query, second data related to the database queries in the memory of the second computer accessing, as part of execution of the query, the remote memory through a remote direct memory access (RDMA) network interface, wherein the accessing is based on the access pattern; and returning query results based on the query.

14. The one or more non-transitory computer-readable media of claim 13, the actions further comprising communicating with a memory broker to request the allocation of memory of the second computer.

15. The one or more non-transitory computer-readable media of claim 13, the actions further comprising reporting unused memory of the first computer to a memory broker for allocation to other computers.

16. The one or more non-transitory computer-readable media of claim 13, the actions further comprising:
 maintaining a primary cache in the local memory of the first computer, the primary cache having multiple entries;
 maintaining a secondary cache in the memory of the second computer;
 evicting a first entry from the primary cache;
 writing the first entry to the secondary cache;
 detecting a primary cache miss for requested data; and
 in response to detecting the primary cache miss, checking the secondary cache for the requested data.

17. The one or more non-transitory computer-readable media of claim 13, the second data comprising one or more of a table, a table variable, a cursor, a cache, a buffer pool, an index, a materialized view, or an intermediate result.

18. The one or more non-transitory computer-readable media of claim 13, the second data comprising a semantic cache.

19. The method of claim 1, further comprising:
 sending, to the memory broker, an area of unused main memory available for remote use; and
 sending a policy that indicates a duration that the unused main memory is available and an access pattern allowed for the unused main memory.

20. The method of claim 19, further comprising sending, to the memory broker, an indication that the unused main memory is no longer available for remote use.

* * * * *